W. V. DICK.
HEAT RESISTING CABINET.
APPLICATION FILED MAR. 25, 1914.

1,249,604.

Patented Dec. 11, 1917.
2 SHEETS—SHEET 2.

UNITED STATES PATENT OFFICE.

WILLIS V. DICK, OF MARIETTA, OHIO, ASSIGNOR TO THE SAFE-CABINET COMPANY, OF MARIETTA, OHIO, A CORPORATION OF OHIO.

HEAT-RESISTING CABINET.

1,249,604.   Specification of Letters Patent.   Patented Dec. 11, 1917.

Application filed March 25, 1914. Serial No. 827,079.

*To all whom it may concern:*

Be it known that I, WILLIS V. DICK, a citizen of the United States, residing in the city of Marietta, Washington county, Ohio, have invented a new and useful Heat-Resisting Cabinet, of which the following is a specification.

My invention relates to heat resisting cabinets and the objects of my device are to provide an article which can be economically made, easily assembled and designed so that it can be shipped in a knock down condition, thereby occupying a minimum of space in transportation and providing for ease of assembling at its destination.

The construction of my invention is such that should it be subjected to a high temperature there will be strong resistance to the entrance of heat to the interior of the cabinet, and it is therefore a safe storage place for valuable papers, documents or other articles against risk of loss in the event of fire.

Further advantages will be brought out in the following specification and illustrated in the drawings hereto attached.

In the said drawings

In my improved construction I use outer and inner walls of sheet metal the former having insulating material such as asbestos or the like on its inner surface, and the latter being provided with similar insulating material on its outer face.

Between the said outer and inner walls, a non conducting air space is provided to resist the passage of heat from the outside to the inside of the structure.

Figure 4:
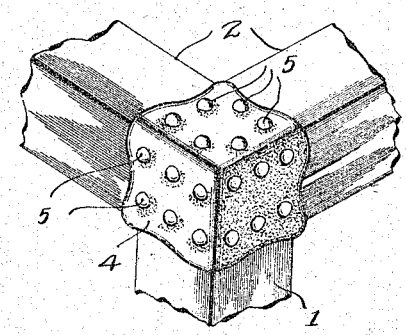
Fig. 4 is a detail perspective of one form of corner construction.
Figure 3:
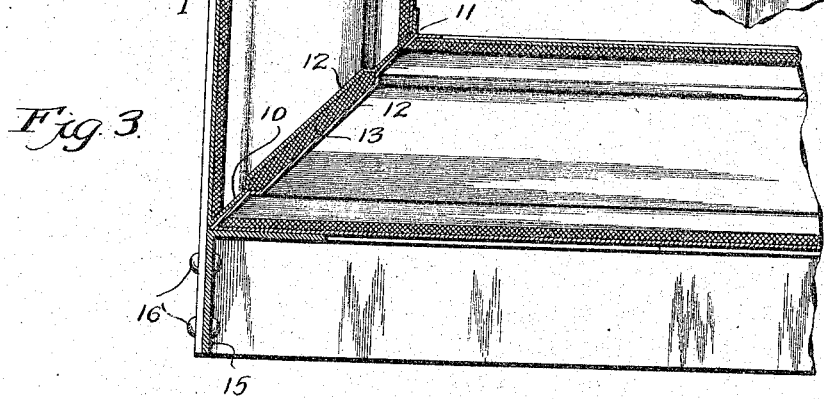
Fig. 3 is an enlarged detail section on the line 3—3 of Fig. 1.

In the drawings I show a frame composed of upright members 1, and horizontal members 2, the said members being cut to the proper form and secured to one another by welding or other suitable means. In Fig. 4 one method of this kind is shown, consisting of the corner pieces 4, secured to the members 1 and 2 by means of the rivets 5, or, if preferred, they can be fastened in place by means of flat head screws through the members 1 and 2 and tapped into the corner pieces 4 thereby giving the corner pieces a perfectly smooth outer surface free from projections of any kind.

Figure 1:
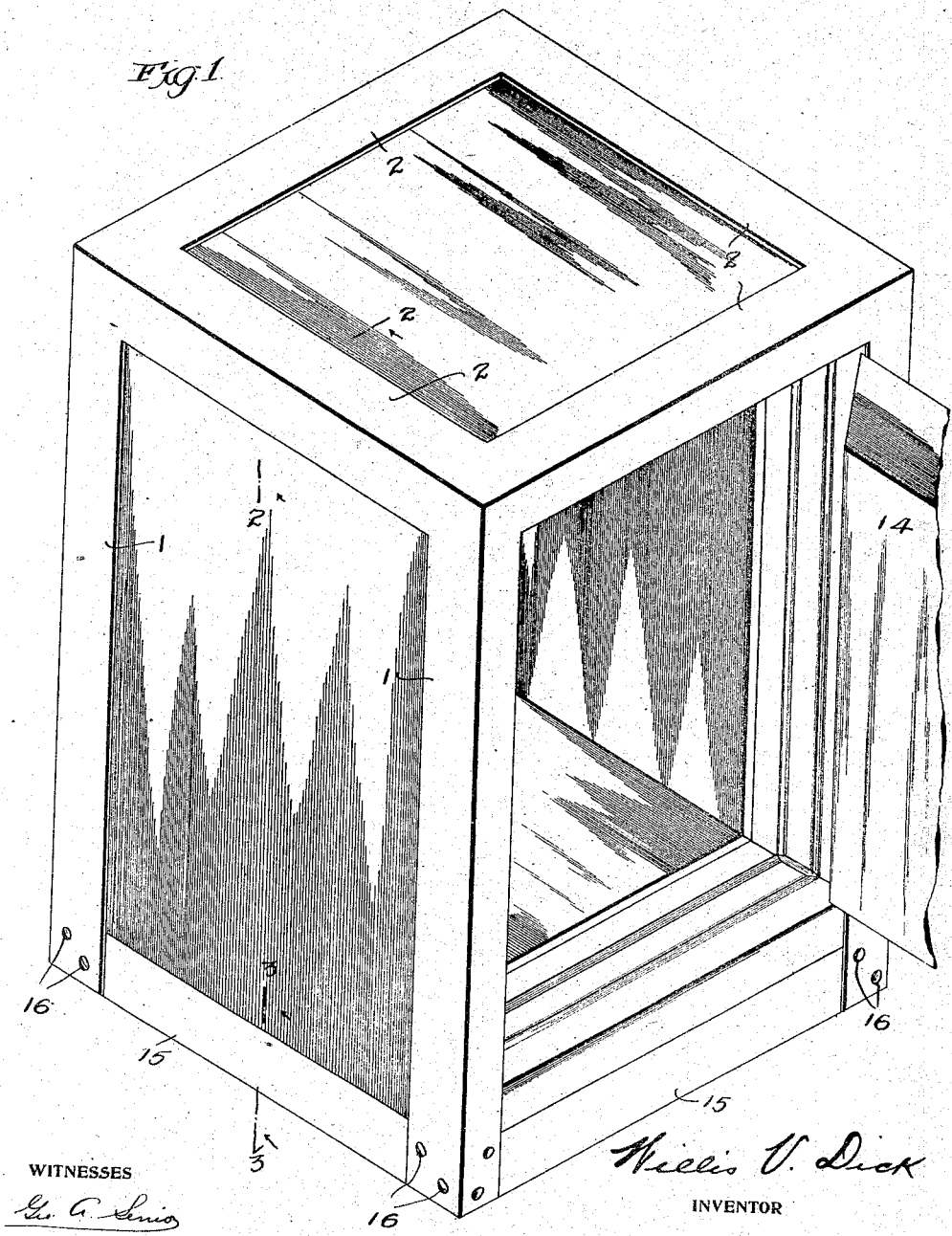
Figure 1 is a perspective view of my device as assembled.
Figure 2:
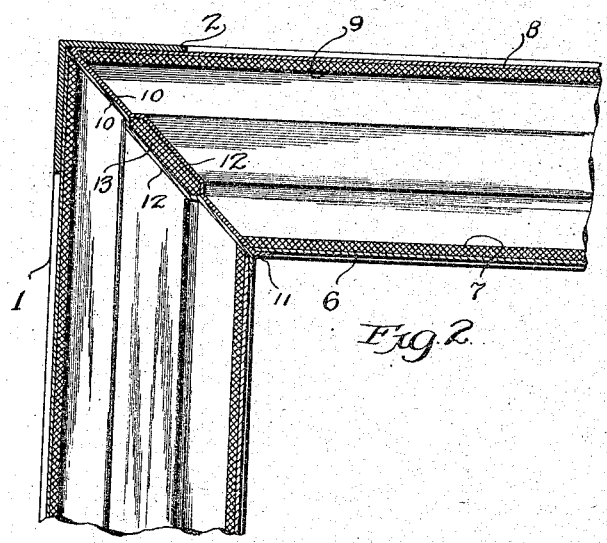
Fig. 2 is an enlarged detail section on the line 2—2 of Fig. 1.

The construction of the top, sides and bottom of my structure admits of a great variety of methods, but I show a preferred form in Fig. 2, where the inner wall 6 lined with insulating material 7 and the outer wall 8 similarly provided with the insulation 9, are provided to form the top, the slope for the miter joint between the top and side being formed by bending the outer wall sheet 8 as at 10 and carrying the same down at the required angle to form the ledges 11, to which the inner wall sheet may be brazed or otherwise secured, the word "brazed" as used in the claims being understood to include its equivalent.

To seal the said miter joints between the various members of the structure the slopes 10 are crimped as at 12 to form recesses for the reception of the insulating material 13. As the construction of the sides, bottom and top is identical in this preferred form, the same reference characters are used in the drawings to designate these parts.

The structure is provided with a door 14 hinged to one of the uprights 1 and provided with the usual form of combination lock (not shown).

In assembling my device the members 1 and 2 are assembled to form a frame, the top is positioned, the sides are then slipped into place, and the bottom is inserted. These members are then secured in the frame by the member formed by the angles 15. This said member tightly abuts the bottom and is rigidly fastened to the uprights 1, in any suitable manner, the drawings herewith showing the same secured by rivets 16.

Another form of construction which could be used would consist of a frame comprising the angle iron members welded together, and the forming of an inner integral structure composed of the top, back, and sides which can be positioned inside the said frame after the latter is assembled.

The corner pieces 4 can be constructed of German silver or other material to provide a good appearance and an ornamental effect.

From the drawings and this description the simplicity and economy of my improved construction and the ease of assembling are obvious.

Its heat resisting properties can also be plainly seen. The outer wall members being lined with insulating material will serve to resist the entrance of heat; the air spaces between the outer and inner walls being sealed, provide a blanket of dead air which serves as an effective non-conductor of any heat which may penetrate the outer walls; and the inner wall members having another lining of insulating material combine to provide a most efficient safeguard to the contents in the interior of the structure.

I do not desire to confine myself strictly to the preferred form shown and described herein, as this is but one of many modifications within the spirit of my invention.

I claim

1. A safe comprising two composite walls disposed at right angles and having a miter joint between them, said walls comprising respectively inner sheet-metal members and outer sheet-metal members and having beveled extensions integral with certain of said members, said beveled extensions having end flanges overlapped and brazed to the other sheet-metal members, said beveled extensions being bulged apart through a portion of their lengths forming an insulating chamber along the miter joint.

2. A safe comprising two composite walls disposed at right angles and having a miter joint between them, said walls comprising respectively inner sheet-metal members and outer sheet-metal members and having beveled extensions integral with certain of said members, said beveled extensions having end flanges overlapped and brazed to the other sheet-metal members, said beveled extensions being bulged apart through a portion of their lengths forming an insulating chamber along the miter joint and a filling of insulating material disposed in said chamber.

WILLIS V. DICK.

Witnesses:
 E. H. WIGGINTON,
 K. R. MEREDITH.

Copies of this patent may be obtained for five cents each, by addressing the "Commissioner of Patents, Washington, D. C."